United States Patent Office 3,394,652

Patented July 30, 1968

3,394,652
OPTICAL SCANNING METHOD FOR PREPARING ETCHING RESISTS

Wilfred B. Marsh, Green Brook, and Walter M. Thode, North Plainfield, N.J., assignors to Art Color Printing Company, Dunellen, N.J., a corporation of New Jersey No Drawing. Filed May 20, 1966, Ser. No. 551,543
1 Claim. (Cl. 101—401.1)

ABSTRACT OF THE DISCLOSURE

A method of preparing gravure etching resists utilizing electro-optical scanning techniques. Instead of the conventional preparation of color separation negatives in an optical scanner, the invention contemplates the direct use of photosensitive resists therein. The optical scanner thereby creates directly, from the color original (print or transparency), the color separated gravure resists ready for laydown on copper and etching. This obviates the necessity of making the transition, as required by the prior art, from negatives to positives and then back to negatives (i.e., the resists) in the development of the color separations—rather, the "negative" resists are directly reproduced from the color original which is to be duplicated, with the appropriate thicknesses of resist material having been generated within the optical scanner.

This invention relates to color reproductions, and more particularly, to a method for expeditiously producing etching resists used in the reproduction of multi-color originals without the necessity for providing intermediate separation negatives or positives.

The importance of color printing in today's publication industry cannot be emphasized strongly enough. Innumerable fields now require many accurate color reproductions to display and to adequately described their products. Such diverse fields as publishing, advertising, scientific research, industrial design, and many others, depend on having high quality color printing techniques available.

While there are some acceptable color reproduction processes in use today, these prior art techniques are subject to certain drawbacks. Thus, the general prior art approach often involves a relatively long process in terms of both time and number of steps. These methods, while generally producing satisfactory results, are fairly cumbersome and extremely expensive. For example, one basic well-known prior art method for reproducing color originals involves preparing a plurality of color separation negative screens corresponding to the three primary colors and in certain cases to be mentioned below, a "key" or black screen as well. (For example, see Patent 1,843,872 to R. A. Glaser, and Patent 1,885,725 to G. S. Howland.) This result is generally achieved by illuminating a transparency of the original and breaking the light beam passing through the transparency into the three primary color components of the original. This step can be accomplished by passing the light beam through a red filter and recording the color components which pass red light, passing the light beam through a green filter and recording the color components which pass green light, and passing the light beam through a blue filter and recording the color components which pass blue light.

In addition, special techniques well known in the art are used to produce the key or black negative which furnishes "modulation" to a color print to compensate for deficiencies in ink combinations. That is, the use of the key negative in addition to the other three negatives enhances the final color print and in fact provides a better reproduction in terms of color accuracy. (It should be noted that when the initial step consists of making color separation negatives, the negatives are in fact representative of the corresponding color components of the original. Thus, the red filter separation negative will display all the red color of the subject, the green negative all the green, and the blue negative all the blue.)

Continuing with the prior art approach, color separation positives are usually then made from their corresponding negatives. The color separation positives represent a "minus color" display with respect to the original subject. Thus, the red filter separation negative when processed to a positive becomes a "minus red" or a cyan color separation positive. Similarly, the green filter separation negative results in a "minus green" or magenta positive and the blue filter negative emerges as a "minus blue" or yellow positive. (The practical reason for utilizinng a key positive can be explained at this point when it is noted that even the highest quality cyan, magenta and yellow printing inks do not combine to form a neutral black as theory would otherwise dictate. The key negative can be thought of as making up for this tonal irregularity in practice, so that where the three "minus" colors are combined, a neutral black is ultimately achieved.)

Each of the four color separation positives is then used to generate a respective gravure resist. For example, a cyan resist can be formed by exposing the resist to light through the cyan positive, to thereby develop varying thicknesses of hardened resist material in accordance with the cyan color values of the cyan positive. A more complete understanding of this procedure can be had by reference to Patent 3,179,519, issued to Edwin Velten and Jerome R. Harris, and assigned to the asignee of the present invention. Four separate resists (cyan, magenta, yellow and "key") are prepared in this manner and processed. The resists are then laid upon printing members, such as copper cylinders, and following "hot water development," an etchant is applied to the resists, also in a conventional manner. Four printing cylinders are thereby developed, and with the application thereon of cyan, magenta, yellow and black inks respectively, followed by successive roll printing, a color reproduction of the original colored subject is produced.

This technique, with its many steps, has been somewhat improved upon by the so-called electro-optical arrangements. In such arrangements, all the steps described above are retained, but the color component detection which results in the forming of the color separation negatives has been "automated" by utilizing electronic scanning techniques to scan the original colored subject and to thereby develop, generally in synchronism, the requisite color separation negatives. This technique is by now well known, being generally described, in for example, Patent No. 2,879,326 issued to J. A. C. Yule.

From the above brief discussion of the prior art, it can be seen that although acceptable arrangements for producing color reproductions are available, these arrangements are relatively complex and correspondingly expensive. Regardless of what the precise process involved is, the plurality of steps indicated above must normally be followed.

It is therefore an object of this invention to furnish an improved color reproduction method to obviate one or more of the aforesaid difficulties.

It is a further object of this invention to eliminate the steps of producing color separation negatives and positives in color reproduction.

The method contemplated by this invention involves making use of, for example, the optical scanning techniques already well known in the art. Rather than forming the color separation negatives and positives, however, the gravure resists required as end products (see above) are directly affected by the scanning signals. The resists (which may be photosensitive, carbon tissue, etc.) are pre-screened to display on each of them the conventional cross-hatched cells and walls generally used in gravure printing; as used herein, the term "photosensitive" may be taken to mean gelatin-silver-halide resists as referred to on page 171 of "Rotagravure" by Cartwright et al. (MacKay Publishing Co., 1956), while the pre-screening is of the type referred to on page 153 of Cartwright et al. The pre-screened resists are then placed in the "negative-carrying" section of an optical scanner, with the scanner controls set to generate a negative image. (A typical optical scanner includes facilities for generating either a positive or a negative image.) A transparency of the colored subject, reproduction of which is desired, is placed in the "input" holder of the scanner and light from an illuminating source is caused to pass through the transparency. The resultant beam (generally an image equivalent to the subject) may then be appropriately focused and condensed according to the particular application involved.

The beam is split into the three components (or four if a "key" printing member is to be prepared) as mentioned above, and after suitable and well-known photoelectric pickup and color correction of the split beam components, electronic output signals are generated in proportion to the red, green, blue and "key" component values representative of the primary color content of the original subject. (The key printer signal can be generated by elements which sense the three other signals and develop an appropriate compensating value signal. Other techniques to produce similar results will be apparent to those skilled in the art, depending upon the type of scanner being used.) These signals are then utilized to energize at least one variable light source which separately illuminates each of the four resists in the scanner's negative section in synchronism with the scanning of the original. The respective negative resists are thereby generated directly. Suitable filtering means can be employed in conjunction with the variable light source (or sources) to control the resist exposures, ultimately leading to contrast variations in the finished reproduction. For example, yellow, ultraviolet or other intermediate range filters can achieve the desired results.

The actual color printing proceeds in a conventional manner, including the steps of processing the resists (in the case of photosensitive resists), laying down the resists on printing members, hot water developing the resists, etching the printing members, applying ink thereto, etc., and a color reproduction is thereby produced without the color separation negatives and positives.

It is therefore a feature of this invention that gravure color printing reproductions are furnished without the necessity of utilizing color separation negatives and positives.

It is a further feature of this invention that an optical scanner is employed to directly generate a plurality of resists for color printing.

The above brief description, as well as further objects, features and advantages of the present invention, will be more fully appreciated by reference to the following detailed description of a presently preferred. but nonetheless illustrative method demonstrating objects and features of the invention.

This invention contemplates the utilization of any one of a number of commercially available "optical scanners," such as those manufactured by the K. S. Paul Co. of England, Fairchild Camera Corporation, the Crosfield Company of England (e.g., their Diascan 101), the Hell Company (Germany), etc. This invention represents a significant advance in the reproduction and duplication field by virtue of providing a substantial reduction in time, the number of steps and the overall supervisory effort required by eliminating the necessity for preparing color separation negatives and positives.

As previously described in general, the prior art requires numerous steps, some relatively complex in nature, to achieve, for example, color reproduction. (See, for example, the above-mentioned Glaser and Howland patents.) However, the method described and taught by the present invention dispenses with at least two formerly crucial steps in these prior art techniques.

In order to facilitate this description, the method of this invention will be described with general reference to a typical prior art scanner as disclosed in FIG. 1 of the above-mentioned Yule patent. However, it will be appreciated by those skilled in the art that this is just one type of optical scanner and that the method of the invention is equally applicable to many other similar scanning devices.

The Yule and other similar scanners comprise a basic transparent cylinder having both rotational and axial movement. Assuming an original color transparency is to be reproduced, the multi-color transparency is placed on one portion of the transparent cylinder where it is generally illuminated from within the cylinder. Instead of placing photosensitive negative film on the remaining sections of the cylinder, however, the four necessary gravure resist "mats" themselves are placed in these sections lengthwise along the cylinder. (It will be recalled that three of the resists are for the "minus" colors of cyan, magenta and yellow, while the fourth resist is for the purpose of developing a balancing or compensating "key" coloring effect.) It may therefore be said that each resist mat occupies a position on the transparent cylinder which it normally used to receive a laid-down photosensitive negative film for the development of color separation negatives (or positives) as in the prior art; the resists are therefore in the "negative-carrying" section of the scanner cylinder or other suitable holding means. (Appropriate variations will be available to those skilled in the art depending upon the scanner in use—for example, with the Crosfield Diascan 101, the resists can be exposed on a one-at-a-time basis in succession, rather than in complete and simultaneous synchronism with the scanning of the original.)

Each resist is now in position to be separately exposed to light in proportion to the appropriate color content of the original. The scanner controls are switched to the "negative" setting, whereby the light output signals will be proportional (as to intensity and location) to the red, green, blue and key tonal values of the original. (If the scanner "positive" setting were used, signals proportional to the cyan, magenta, yellow and black tonal values of the original would be generated.) For purposes of description, the separate resists to be prepared will herein be identified as the cyan, magenta, yellow and black resists, since these correspond to the ink color to be applied to the respectively formed printing cylinders. Thus, the "cyan" resist is exposed to light which is representative (as to intensity and location) of the red color values of the original. Similar intensity and locational exposures take place with respect to the other three resists corresponding to the green, blue and key values of the original.

The technique by which such exposures take place can occur in a number of ways depending upon the scanner in use as mentioned previously. Referring to the Yule scanner only way of example, the original multi-color transparency, mounted on the transparent cylinder, is illuminated from within and the resultant light beam is appropriately focused and collimated and thereby directed into the optical path of a plurality of beam-splitting devices which develop four equal intensity subsidiary images. Each beam is then passed through a respective light filter in order to develop the appropriate optical output signals. Thus, a first of the four light beams is passed through a red filter and the transmitted light (minus red or cyan) impinges on the photosensitive surface of a photoelectric cell which generates a potential output. Similarly, magenta (minus green) and yellow (minus blue) potential outputs are developed by the impinging of the subsidiary light beams on respective photoelectric cells after the light beams have passed through green and blue filters respectively. As mentioned above, the key printer output can be generated by a combinational circuit which takes into account the amount of copensation necessary to properly enhance the color tones as represented by the other three output signals (Yule FIGS. 2, 4). The key or black printer potential output can also be generated by passing a fourth subsidiary light beam through, for example, an infrared filter and causing the resultant transmitted light to impinge on a photoelectric cell (Yule FIG. 1). Other techniques and equipment for producing a key signal are available to those skilled in the art; the present invention can be utilized independent of which techniques and equipment are selected.

The potential outputs are fed to color correction circuitry, which in most scanners provides for color and tone correction, undercolor removal, etc. The color correction circuitry ultimately develops the separate output signals which are necessary to respectively energize the light source or sources to expose corresponding photosensitive resists in proportion to the intensity (at particular locations) of the primary color content of the original. The following is a description of the steps taken with respect to the formation and use of the cyan resist. Thus, a first output signal is developed to energize a glow lamp or variable light source in proportion to the red content of the original, after the cyan photoelectric cell signal has been appropriately color corrected.

The separate cyan resist which is to be exposed is positioned on the transparent cylinder in optical relationship with the corresponding glow lamp (or the variable light source as in the Crosfield Diascan 101 optical scanner). In this manner, the red output signal from the color correction circuitry energizes its respective glow lamp to expose the cyan resist mat in proportion to the red content of the original transparency.

Assuming a photosensitive type of gravure resist merely for descriptive purposes, the red signal will energize its glow lamp in such a manner as to expose resist material in regions corresponding to areas on the original transparency which contained the most red color values. The light from this glow lamp will therefore affect the cyan resist to the greatest extent in the regions thereof which correspond to the least cyan content of the transparency. In these resist regions, the greatest thickness of exposed and hardened resist material will be generated. Conversely, in the resist regions corresponding to the original transparency's areas in which there existed relatively small quantities of red tonal values, the light from the glow lamp will expose the corresponding resist material to a lesser degree, thereby generating a relatively small thickness of exposed and hardened resist material.

This exposed resist is later developed and processed in a well-known manner (i.e., utilizing conventional photographic techniques in the case of a photosensitive resist—where a carbon tissue type of resist is used, no photographic processing is required), and is then laid down on, for example, a copper printing cylinder. Hot water development follows (see above-mentioned Velten and Harris patent), and an etchant is then flowed onto the resist, having the greatest penetrating effect thereof in the resist regions where the narrowest thickness of developed resist is present. These narrow thickness regions, as mentioned above, correspond to the areas of the original transparency where relatively little red color was present. Accordingly, the etchant will cause relatively deep wells or depressions to be present on the cyan printing cylinder in these "high cyan" regions. On the other hand, the etchant will have the least penetration of the resist in the regions thereof where the greatest thickness of resist material has been developed and hardened. These are the regions which correspond to the greatest amount of red color in the original transparency. The etchant will cause relatively shallow wells or depressions to be developed in the printing cylinder regions corresponding thereto.

When cyan printing ink is applied to the etched cyan printing cylinder, relatively greater amounts of ink will be contained in the deeper wells, while relatively little ink will be held by the shallower wells. Thus, when a printing cycle ultimately takes place, the cyan cylinder will deposit ink on, for example, printing paper, in proportion to the cyan (i.e., minus red) tonal values of the original transparency.

A procedure similar to that outlined above with respect to cyan takes place for each of the other colors to generate respective magenta, yellow and black resists. Corresponding etching steps also take place, whereby three other printing cylinders are developed. Magenta, yellow and black inks are respectively applied to these cylinders and the deeper wells thereof hold greater quantities of respective inks, while the shallower wells hold lesser quantities thereof. The same illustrative paper upon which the cyan values have been deposited as described above is successively brought into contact with the inked magenta, yellow and black cylinders, so that these tonal values of the original transparency may be deposited thereon. The combinations of the various minus ink values produce a color reproduction of the original multicolor transparency. The normal prior art steps of preparing color separation negatives and positives have been completely eliminated, thereby saving considerable time and expense without in any way reducing the quality of the produced reproduction.

It is to be understood that the above-described arrangements are illustrative of the application of the principles of the invention. Numerous other arrangements may be devised by those skilled in the art without departing from the spirit and scope of the invention.

What is claimed is:

1. The method of producing a plurality of gravure resists capable of being used to print a reproduction of a color original including the steps of forming a field of gravure screen cells and walls on each of said resists, placing a plurality of unexposed ones of said resists in an optical scanner, placing a transparency of said original to be reproduced in said optical scanner, scanning said transparency for color tones of red, green and blue, generating on respective ones of said resists exposed regions proportional in thickness to the red, green and blue tonal values of said color original and producing said reproduction of said color original by etching plural printing members through respective ones of said exposed resists whereby depressions are formed in each of said printing members for receiving quantities of cyan, magenta and yellow inks respectively in inverse proportions to the color content in said color original of said red, green and blue tonal values.

References Cited

UNITED STATES PATENTS

| | | |
|---|---|---|
| 1,221,780 | 4/1917 | Wald. |
| 1,656,338 | 1/1928 | Ranger. |
| 2,069,576 | 2/1937 | Cohen. |
| 2,136,340 | 11/1938 | Hardy. |
| 2,879,326 | 3/1959 | Yule. |

OTHER REFERENCES

Cartwright, H. M., et al.: Rotogravure, MacKay Pub. Co., Lyndon, Ky., 1956, TR980. C3r., pp. 143, 153, 171.

DAVID KLEIN, *Primary Examiner.*